United States Patent [19]

Odenkirchen et al.

[11] Patent Number: 4,796,143

[45] Date of Patent: Jan. 3, 1989

[54] ELECTRIC TRANSFORMER FOR UNDERGROUND MINING MACHINE

[75] Inventors: Horst Odenkirchen; Klaus Lodwig, both of Bochum, Fed. Rep. of Germany

[73] Assignee: Gebr. Eickhoff Maschinenfabrik u. EisengieBerei mbH, Fed. Rep. of Germany

[21] Appl. No.: 161,752

[22] Filed: Feb. 29, 1988

[30] Foreign Application Priority Data

Mar. 7, 1987 [DE] Fed. Rep. of Germany ....... 3707387

[51] Int. Cl.4 ......................... H02H 5/04; H01F 27/10

[52] U.S. Cl. ........................................ 361/37; 336/60; 336/83; 336/212; 340/646

[58] Field of Search ............... 361/35, 37, 38; 336/55, 336/57, 58, 59, 60, 61, 83, 212; 340/646

[56] References Cited

U.S. PATENT DOCUMENTS

| | | | |
|---|---|---|---|
| 2,579,308 | 12/1951 | Dole | 336/83 |
| 3,317,874 | 5/1967 | Hensinper | 336/83 X |
| 3,427,577 | 2/1969 | Denes | 336/61 |
| 4,172,243 | 10/1979 | Daughenty et al. | 336/60 |
| 4,303,902 | 12/1981 | Lesster et al. | 336/83 |

*Primary Examiner*—Thomas J. Kozma

*Attorney, Agent, or Firm*—Clifford A. Poff; Thomas H. Murray

[57] ABSTRACT

A transformer for use on an underground mining machine, such as a shearer loader. The transformer is cylindrical in shape and contains a central cavity extending therethrough to allow positioning of the transformer about a drive shaft of the motor of the mining machine. A tubular housing surrounds a cylindrical iron core with such housing containing a helically wound coolant duct to allow coolant fluid to flow therethrough.

14 Claims, 2 Drawing Sheets

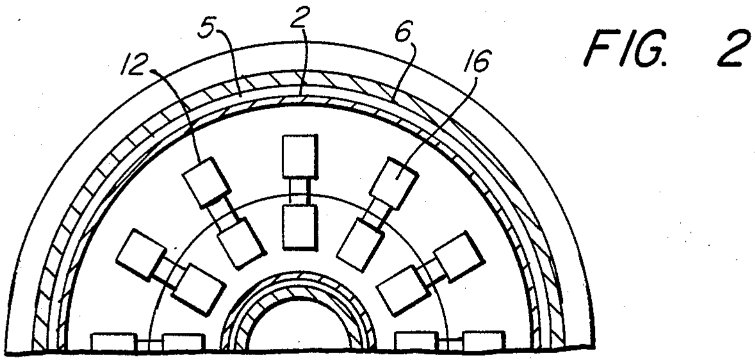
FIG. 2
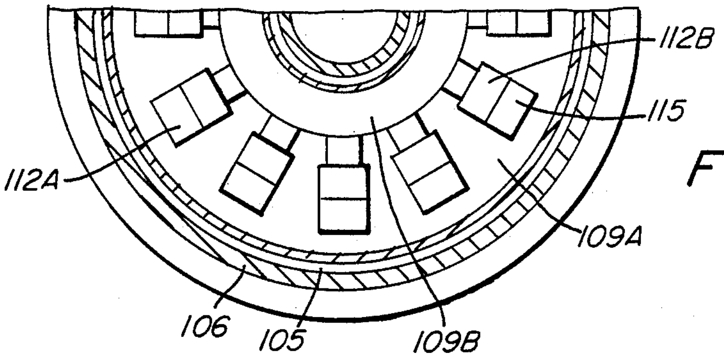
FIG. 4
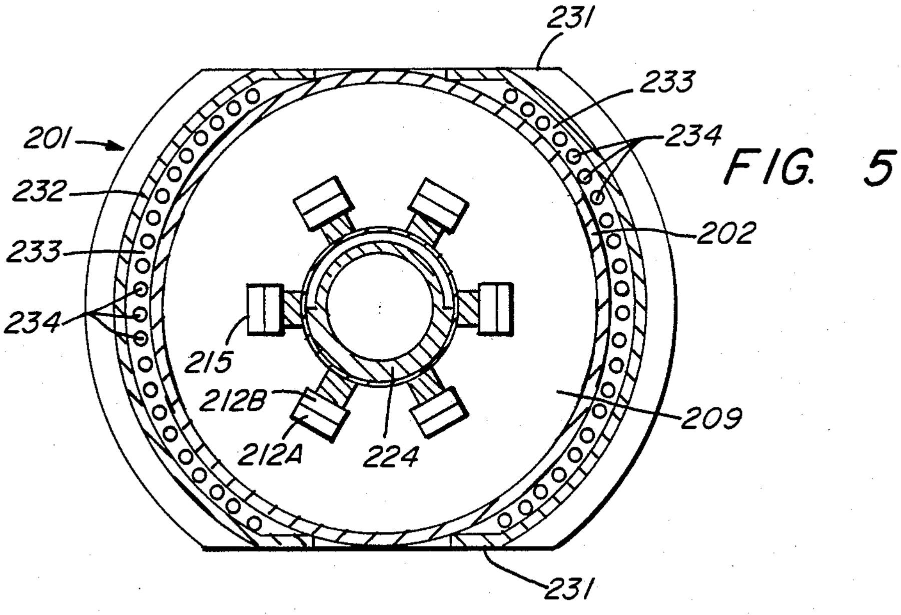
FIG. 5
FIG. 6
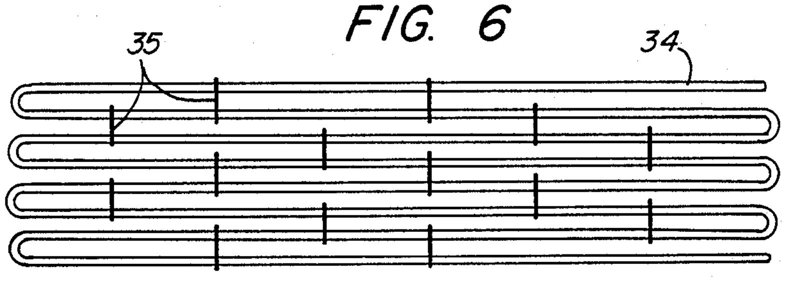

ELECTRIC TRANSFORMER FOR UNDERGROUND MINING MACHINE

BACKGROUND OF THE INVENTION

1. Field of the Invention

The present invention relates generally to transformers, and, more particularly, to a transformer for use on a winning machine utilized in underground mining.

2. Description of the Prior Art

Winning operations which involve long wall mining procedures typically utilize electrically powered drum cutter mining machines. The drum cutter mining machine, also referred to as a shearer loader, is positioned proximate to a mine wall, whereat a mineral is sheared from the mine wall face. The drum cutter mining machine includes at least one, and usually two, circular cutting drums extending from opposite ends of the mining machine. A first cutting drum, the leading cutting drum extends at an upwardly projecting angle from the drum cutter mining machine. The second cutting drum, the trailing cutting drum, extends at a downwardly extending angle from the drum cutter mining machine. Three-phase electrical motors cause the cutting drums to rotate, in either the clockwise or counter-clockwise directions, depending upon the direction of the drum cutter mining machine. During cutting operations, the leading cutting drum shears a first portion of the mine wall, and the trailing cutting drum shears a second portion of the mine wall.

Because a limited amount of space is available in the mine, a primary design consideration when designing the mining machine is to minimize the dimensions of non-cutting portions of the machine. Transformers must be positioned on the mining machine in order to provide the cutting drum motors with electrical power of suitable characteristics. Because of the above-mentioned size limitations, efforts have been made to limit the size of the transformers.

Design considerations additionally require the inclusion of coolant systems to prevent overheating of the transformer. Still further, the design of the transformer must be such that the transformer may be quickly and simply dismantled and reassembled.

It is therefore the object of the present invention to provide an improved transformer for an underground mining machine of minimum dimensions.

SUMMARY OF THE INVENTION

In accordance with the present invention, a transformer for an underground mining machine is disclosed. The transformer includes an outer tubular housing having an elongated cavity extending therethrough, a cylindrical iron core means positioned in the elongated cavity of the tubular housing wherein the iron core means has an outer diameter corresponding to the inner diameter of the tubular housing. A plurality of longitudinally extending channels extends through the iron core means to allow channeling of primary and secondary windings of the transformer therethrough. Additionally, coolant ducts extend through the outer tubular housing to provide a path for coolant fluid, thereby allowing the coolant fluid to carry away heat generated in the iron core means.

In one embodiment of the present invention, the cylindrical iron core means is bipartite, and is comprised of an outer annular portion having a central bore extending therethrough, and an inner cylindrical portion positioned in a central bore formed by the outer annular portion. The outer annular portion may contain the plurality of longitudinally extending channels for channeling both the primary and secondary windings therethrough, with the primary and secondary windings being separated by insulating strips. Alternatively, the outer annular portion may contain a first plurality of longitudinally extending channels to allow channeling of the primary wires therethrough, and the inner cylindrical portion may contain a second plurality of longitudinally extending channels to allow channeling of the secondary windings therethrough, thereby avoiding the necessity of insulating strips.

Preferably, the iron core means includes a cylindrical cavity extending therethrough wherein the cylindrical cavity has a longitudinal axis extending in a direction similar to the direction of a longitudinal axis of the outer tubular housing. In the embodiment in which the iron core mean is bipartite, the cylindrical cavity extends through the inner cylindrical portion. The cylindrical cavity allows an inner tubular housing to be positioned to extend through the cavity. The inner tubular housing may further contain coolant ducts for providing a path for coolant fluid to allow the coolant fluid to carry away heat generated in the iron core means.

The coolant ducts extending through both the outer tubular housing and the inner tubular housing may be comprised of helical channels extending through the respective housings with the helical channels of the respective housings being connected theretogether by a connecting channel to allow a coolant fluid to pass through both the outer tubular housing and the inner tubular housing.

Alternatively, the coolant ducts may be comprised of a plurality longitudinally extending pipe members extending through the outer tubular housing wherein adjacent ones of the pipe members are connected at each ends thereof by U-shaped pipe members to thereby create a path for the coolant fluid. The lnngitudinally extending pipe members may further be supported by transversely extending ribs positioned at periodic intervals along the lengths of the pipe members. Preferably, the inner tubular housing is of dimensions to allow a rotatable transmission shaft of the underground mining machine to extend therethrough. The preferred embodiment of the present invention further includes a temperature sensing means for sensing the temperature of the iron core means, and an alarm means for generating an alarm responsive to a high temperature sensed by the temperature sensing means.

BRIEF DESCRIPTION OF THE DRAWINGS

The present invention will be better understood when read in light of the accompanying drawings in which:

FIG. 2 is a horizontal cross section of the transformer of FIG. 1 taken along line A-B of FIG. 1;

FIG. 4 is a horizontal cross section of the transformer of FIG. 3 taken along lines C-D;

FIG. 5 is a horizontal cross section of a third embodiment of the present invention; and FIG. 6 is a detailed diagram illustrating the coolant pipes utilized to cool the iron core of the transformer of the embodiment of FIG. 5.

DESCRIPTION OF THE PREFERRED EMBODIMENTS

Figures 1, 3:
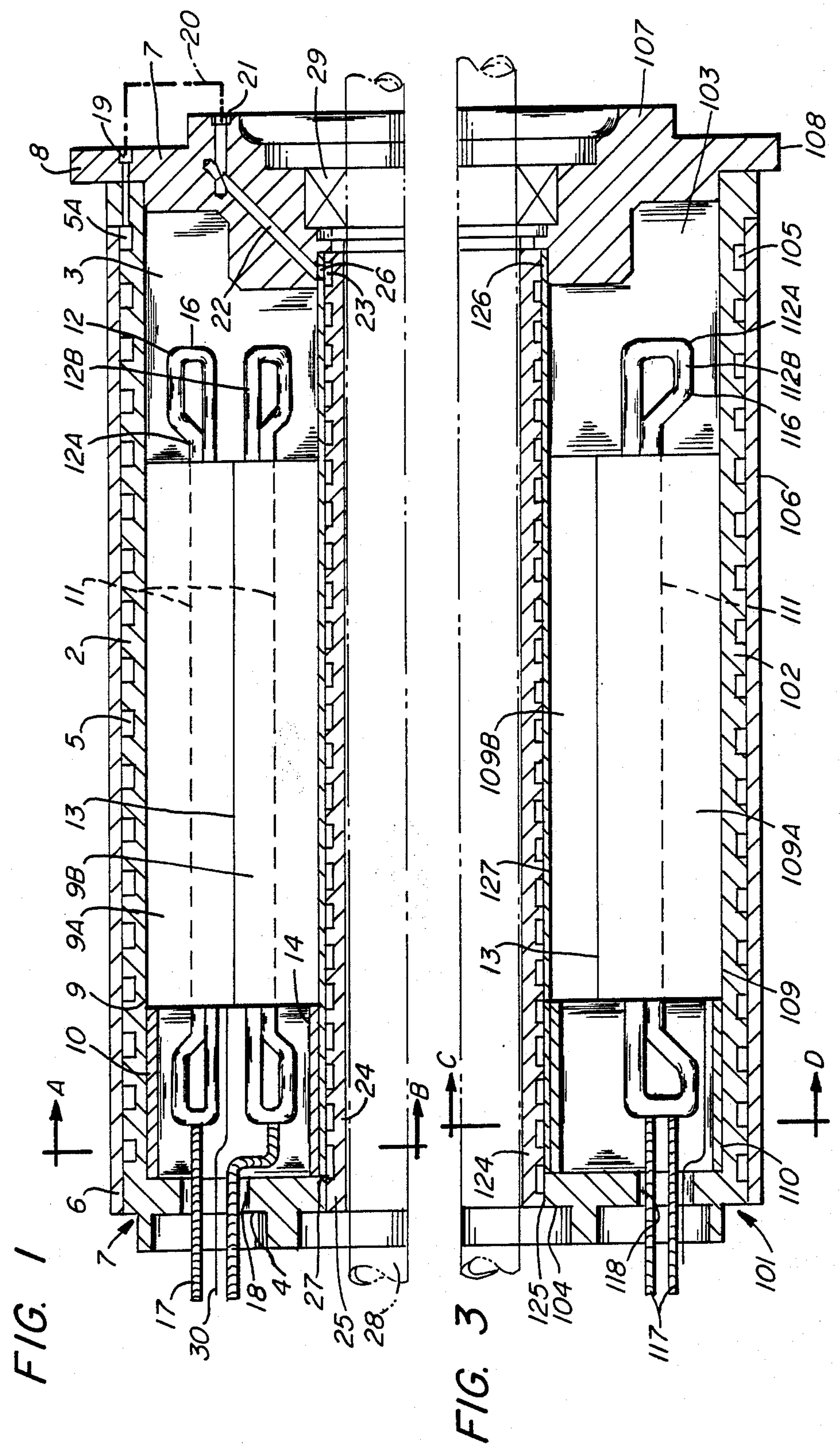
FIG. 1 is a longitudinal cross section in elevation of one half of the cylindrical transformer of the present invention.
FIG. 3 is a longitudinal cross section in elevation of one half of a second embodiment of the transformer of the present invention.

Referring first to the illustrations of FIGS. 1 and 2, there is illustrated a first embodiment of the transformer 1 of the present invention. The transformer 1 includes an outer tubular housing 2 having a central bore 3 extending therethrough, wherein a first end of bore 3 is enclosed by housing front wall 4. The external surface of the cylindrical housing 2 contains groove 5 forming a helical pattern about the surface thereof. Sleeve member 6 surrounds housing 2, along the entire length thereof, thereby enclosing the helical groove 5 such that a helical channel is formed. Detachable end plate 7 having a flange 8 protruding therefrom encloses a second end of bore 3. End plate 7 functions to seal the second end of the central bore 3, and is held in position by screw bolts (not illustrated) which engage in drilled holes in an end surface of the housing 2.

Positioned in the central bore 3 of the housing 2 is cylindrical iron core 9 which has an outer diameter corresponding to the inner diameter of the housing 2. Iron core 9 is positioned in the bore 3 by sleeve 10 which extends from the front wall 4 at the first end of the bore 3. Iron core 9 contains a plurality of longitudinally extending channels 11 which extend along the entire length of the core 9. Preferably, the plurality of channels 11 are positioned equidistantly from one another about the circumference of the iron core 9. Channels 11 are of dimensions suitabe to allow the transformer windings 12 to extend therethrough.

As illustrated in FIG. 2, iron core 9 is actually comprised of two parts, an outer annular part 9A whose outer diameter conforms with the inner diameter of the tubular housing 2, and inner cylindrical part 9B. Bore 13 extending through outer annular part 9A allows inner cylindrical part 9B to extend therewithin. In the embodiment of FIGS. 1 and 2, both portion 9A and portion 9B contain longitudinally extending channels 11. Channels 11 of each portion are formed so as to correspond in a one-to-one relationship with each other. Channels 11 extending through outer annular portion 9A contain the primary windings 12A of the transformer 1, and channels 11 extending through the inner cylindrical portion 9B contain the secondary windings 12B. In most instances, the primary winding 12A will be of a greater diameter than the diameter of the secondary windings 12B, and, therefore, the channels 11 extending through the outer annular portion 9A are of greater diameters than the channels 11 extending through the inner cylindrical portion 9B.

Coil heads 16 of both the primary coils 12A and secoddary coils 12B extend beyond the ends of iron core portions 9A and 9B, and are preferably enclosed in a heat conductive material, such as, for example, a mixture of silicone and aluminum oxide. The terminal ends 17 of the respective windings are connected to external conductors (not illustrated) through an opening 18 in the housing front wall 4. The opening 18 may be gas-sealed by conventional sealing systems.

As illustrated in FIG. 2, the inner cylindrical portion 9B of the iron core 9 contains a longitudinally extending cylindrical cavity. Referring again to FIG. 1, inner tubular housing 24 is positioned in this cavity, and has a length of a magnitude similar to that of the length of housing 2. A first end of housing 24 forms bore 25 of the housing front wall 4. A second end of housing 24 forms bore 26 of end plate 7. Similar to the helical groove 5 formed on the surface of outer tubular housing 2, inner tubular housing 24 contains helical groove 23. Sleeve 27 surrounds housing 24, and covers the exposed faces of helical groove 23, thereby causing groove 23 to form a channel.

Also illustrated in FIG. 1 is thermal control lead 30 which is positioned between terminal ends 17 of the windings and extend through opening 18. Lead 30 is coupled to temperature sensors (not shown) positioned in the channels 11. In the event of an unacceptable temperature rise, an alarm is enunciated which may also be utilized to automatically shut off the mining machine.

Referring now to the illustrations of FIGS. 3 and 4, there is illustrated a second embodiment of the present invention. Similar to the embodiment of FIGS. 1 and 2, transformer 101 is comprised of tubular housing 102 having helically extending groove 105 formed on the outer surface thereof. Sleeve member 106 surrounds the tubular housing 102, to enclose the helical groove 105, thereby forming a channel. Front wall 104 encloses a first end of bore 103, and end plate 107, containing flange 108 protruding therefrom, encloses a second end of bore 103. Again, iron core 109 is of bipirite construction comprised of outer annular part 109A and an inner cylindrical part 109B. Iron core 109 is positioned in the bore 103 by sleeve 110.

In this embodiment, however, channels 111 extend through only the outer annular portion 109A. The channels 111 of this mmbodiment support both the primary windings 112A and the secondary windings 112B. The windings 112A and 112B are electrically separated from one another by insulating strips 115 which extend along the lengths of the primary and secondary windings 112A and 112B. This embodiment is advantageous in that because no gap is required to be maintained between the primary and secondary windings, the diameter of the iron core 109 may be reduced.

Coil head 116 containing bot primary and secondary coils 112A and 112B extend beyond portions 109A and 109B of the iron core 109. Similar to the embodiment of FIGS. 1-2, coil head 116 is preferably contained in a heat conductive material, such as, for example, the mixture of silicone and aluminum oxide. Terminal ends 117 of coils 112A and 112B are connected to external conductors (not illustrated) through opening 118 in housing front wall 104. Again, opening 118 may be gas-sealed by a conventional sealing system.

As illustrated in FIG. 4, inner cylindrical portion 109B contains a longitudinally extending cylindrical cavity. Referring again to FIG. 3, inner tubular housing 124 is positioned in this cavity, and has a length of a magnitude similar to that of the housing 102. A first end of housing 124 forms bore 125 of the housing front wall 104. A second end of housing 124 forms bore 126 of end plate 107. Similar to the helical groove 105 formed on the surface of housing 102, inner tubular housing 124 contains helical groove 123. Sleeve 127 surrounds inner tubular housing 124 and seals grooves 123 thereby forming a channel.

Referring now to the illustration of FIG. 5, there is illustrated a third embodiment of the transformer 1 of the present invention. In this embodiment, iron core 209 is not bipartite, but rather ccomprised of a single cylindrical element. Iron core 209 again contains a plurality of longitudinally extending channels 11 extending therethrough. Similar to the embodiment of FIGS. 3–4, the channels 11 contain both the primary winding 212A and the secondary winding 212B wherein adjacent windings 212A and 212B are separated by insulating strips 215. Similar to the embodiments of FIGS. 1–2 and FIGS. 3–4, transformer 201 of FIG. 3 contains an outer tubular housing 202. Surrounding the tubular housing 202 in this embodiment, however, is semi-cylindrical coolant jacket 232. Positioned between semi-cylindrical jacket 232 and outer tubular housing 202 is coolant chamber 233. Coolant chamber 233 contains a plurality of coolant pipes 234 extending therethrough. Coolant pipes 234 may be connected as illustrated in FIG. 6, wherein adjacent ones of the coolant pipes 234 are connected by U-shaped pipe members. Pipes 234 may be supported by transverse ribs 235. Jacket 232 of transformer 201 of FIG. 5 contains diametrically opposite cut-a-ways or flattenings 231 which cut into the generally cylindrical shape of the transformer housing and thereby reduce the outside dimensions over a certain portion of the total circumference of the transformer 201. Transformer 201 may further include coolant pipes 234 extending through an inner tubular housing 224, similar to the coolant pipes 234 extending through semi-cylindrical coolant chamber 233.

Operation of the instant invention will be described in connection with the embodiment of FIGS. 1–2. It is to be understood, however, that the embodiments of the remaining figures operate in a manner similar to the embodiment of FIGS. 1–2.

In use, the transformer 1 of the present invention is positioned on a underground mining machine in order to change the power characteristics of the electricity suppled to the mining machine. Because the transformer 1 is cylindrical, and because the transformer contains a central cavity extending therethrough, the transformer 1 may be positioned axially between a driving motor and a reduction gear which transmits the driving motion to the cutting drum of the mining machine. The transformer 1 may, therefore, be positioned about shaft 28 connecting such driving motor and reduction gear, only shaft 28 being shown in FIG. 1. FIG. 1 further illustrates shaft 28 as beling positioned within roller bearing 29.

Current in the primary winding 12A is induced in secondary coil 12B in a desired ratio, thereby providing the underground mining machine with useful electrical power.

To prevent temperature build-up of the iron core 9, coolant fluid is caused to flow through the helical groove 5 surrounding the outer tubular housing. Coolant water outlet 19 extending through end plate 7 connects end 5A of groove 5 to cooling water channel 20, and a coolant water inlet 21, also extending connects cooling water channel 20 to water inlet bore 22 and final helical groove 23 of the inner tubular housing 24. Coolant fluid, therefore can pass through the outer tubular housing 2 and inner tubular housing 24 in a heat-transfer relationship to carry away the heat generated by the iron core.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A transformer for an underground mining machine, including:

an outer tubular housing having an elongated cavity extending therethrough;

cylindrical iron core means positioned in said tubular housing, said iron core means having an outer diameter corresponding to the inner diameter of the tubular housing;

a plurality of longitudinally extending channels extending through said iron core means channeling primary and secondary windings of the transformer therethrough; and coolant ducts extending through the outer tubular housing for providing a path for coolant fluid to allow the coolant fluid to carry away heat generated in the iron core means.

2. The transformer of claim 1 wherein said cylindrical iron core means includes an outer annular portion having a central bore extending therethrough and an inner cylindrical portion positioned in said central bore formed by the outer annular portion.

3. The transformer of claim 2 wherein said outer annular portion of the iron core means contains the plurality of longitudinally extending channels channeling both the primary and secondary windings therethrough.

4. The transformer of claim 2 wherein said outer annular portion contains a first plurality of longitudinally extending channels channeling the primary wires therethrough, and said inner cylindrical portion contains a second plurality of longitudinally extending channels channeling the secondary windings therethrough.

5. The transformer of claim 1 wherein said coolant ducts include at least one helical channel extending about the tubular housing.

6. The transformer of claim 5 wherein said cylindrical iron core means includes a cylindrical cavity extending therethrough, said cylindrical cavity having a longitudinal axis extending in a direction similar to the direction of a longitudinal axis of said outer tubular housing, and an inner tubular housing positioned to extend through the cylindrical cavity.

7. The transformer of claim 6 further including coolant ducts extending through the inner tubular housing for providing a path for coolant fluid to allow the coolant fluid to carry away heat generated in the iron core means.

8. The transformer of claim 7 wherein said coolant ducts of the inner tubular housing includes at least one helical channel extending about the inner tubular housing.

9. The transformer of claim 8 wherein a connecting channel connects the helical channel of the outer tubular housing with the helical channel of the inner tubular housing.

10. The transformer of claim 6 wherein said inner tubular housing has a inner diameter to allow positioning of a rotatably transmission shaft of the underground mining machine to extend therethrough.

11. The transformer of claim 1 wherein said primary and said secondary windings are electrically separated by insulating strips.

12. The transformer of claim 1 further including temperature sensing means for sensing the temperature of the iron core means, and an alarm means for generating an alarm responsive to a high temperature sensed by a temperature sensing means.

13. The transformer of claim 1 wherein said coolant ducts include a plurality of longitudinally extending pipe members extending through the tubular housing wherein adjacent ones of the pipe members are connected at each ends thereof by U-shaped pipe members to thereby create a path for the coolant fluid.

14. The transformer of claim 13 wherein said longitudinally extending pipe members are supported by transversely extending ribs positioned at periodic intervals along the lengths thereof.

* * * * *